(12) United States Patent
Rohnert et al.

(10) Patent No.: US 10,050,924 B2
(45) Date of Patent: Aug. 14, 2018

(54) MESSAGING

(75) Inventors: Hans Rohnert, Munich (DE); Adamu Haruna, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1445 days.

(21) Appl. No.: 13/260,121

(22) PCT Filed: Apr. 2, 2009

(86) PCT No.: PCT/EP2009/053933
§ 371 (c)(1),
(2), (4) Date: Dec. 16, 2011

(87) PCT Pub. No.: WO2010/112075
PCT Pub. Date: Oct. 7, 2010

(65) Prior Publication Data
US 2012/0084668 A1  Apr. 5, 2012

(51) Int. Cl.
*H04L 12/58* (2006.01)

(52) U.S. Cl.
CPC ............. *H04L 51/24* (2013.01); *H04L 51/18* (2013.01); *H04L 51/36* (2013.01)

(58) Field of Classification Search
CPC ....... H04L 51/24; H04L 51/18; H04W 88/184
USPC .......................................................... 715/752
See application file for complete search history.

(56) References Cited

U.S. PATENT DOCUMENTS

| | | | | |
|---|---|---|---|---|
| 6,002,758 A | * | 12/1999 | Ely et al. ................. | 379/201.01 |
| 6,272,190 B1 | * | 8/2001 | Campana, Jr. .............. | 375/347 |
| 2003/0126216 A1 | * | 7/2003 | Avila .................... | G06Q 10/107 |
| | | | | 709/206 |
| 2006/0020677 A1 | | 1/2006 | von Koch | |
| 2006/0060646 A1 | * | 3/2006 | Lee ................. | 235/379 |
| 2006/0293031 A1 | * | 12/2006 | Clarke et al. .............. | 455/412.2 |
| 2006/2930316 | | 12/2006 | Clarke et al. | |
| 2008/0075240 A1 | * | 3/2008 | Ramanathan .......... | H04L 12/581 |
| | | | | 379/88.12 |
| 2008/0123686 A1 | * | 5/2008 | Lee ...................... | H04L 51/066 |
| | | | | 370/466 |
| 2008/0222265 A1 | * | 9/2008 | Colson et al. ............... | 709/207 |
| 2009/0213841 A1 | * | 8/2009 | Masson .................. | H04L 51/36 |
| | | | | 370/352 |
| 2009/0240925 A1 | * | 9/2009 | Ishihara et al. ............... | 712/221 |

(Continued)

FOREIGN PATENT DOCUMENTS

| | | |
|---|---|---|
| CN | 1291394 A | 4/2001 |
| CN | 1859678 A | 11/2006 |
| WO | 2008082205 A1 | 7/2008 |
| WO | 2009002066 A2 | 12/2008 |

OTHER PUBLICATIONS

Official Communication issued in the corresponding International Application No. PCT/EP2009,053933, dated Feb. 15, 2010.

(Continued)

*Primary Examiner* — Larry Donaghue
(74) *Attorney, Agent, or Firm* — Squire Patton Boggs (US) LLP

(57) ABSTRACT

A mechanism enabling a user whose user device has received a notification on messages waiting delivery, messages being deferred or waiting for another reason, to convey message-specific, possibly different handling instructions in one go to a network entity responsible for handling of the waiting messages.

20 Claims, 6 Drawing Sheets

(56) References Cited

U.S. PATENT DOCUMENTS

| | | | | |
|---|---|---|---|---|
| 2009/0279455 A1* | 11/2009 | Wang | ................ | H04L 51/36 |
| | | | | 370/260 |
| 2009/0287784 A1* | 11/2009 | Haruna | ................ | H04L 51/063 |
| | | | | 709/206 |
| 2010/0185740 A1* | 7/2010 | Lee | ................ | H04L 51/14 |
| | | | | 709/206 |
| 2010/0199261 A1* | 8/2010 | Shenfield et al. | ................ | 717/107 |
| 2010/0235893 A1* | 9/2010 | Adams et al. | ................ | 726/6 |
| 2011/0016185 A1* | 1/2011 | Zwaal | ................ | H04L 65/104 |
| | | | | 709/206 |
| 2012/0047460 A1* | 2/2012 | McCann | ................ | 715/809 |
| 2012/0084668 A1* | 4/2012 | Rohnert et al. | ................ | 715/752 |
| 2013/0160091 A1* | 6/2013 | Adams et al. | ................ | 726/4 |

OTHER PUBLICATIONS

"Converged IP Messaging Requirements", Draft Version 1.0, Open Mobile Alliance OMA-RD-CPM-V1_0-20090202-D, Feb. 2, 2009, pp. 1-74.

"Converged IP Messaging Architecture", Draft Version 1.0, Open Mobile Alliance OMA-AD-CPM-V1-0-20090320-D, Mar. 20, 2009, pp. 1-51.

"OMA Converged IP Messaging System Description", Draft Version 1.0, Open Mobile Alliance OMA-TS-System_Description-V1-0-20090320, Mar. 20, 2009, pp. 1-106.

Chinese Office Action dated Jan. 27, 2014, for corresponding Chinese Appln. No. 200980159665.4.

* cited by examiner

```
<?xml version="1.0"?>
<message-handler xmlns="urn:oma:xml:cpm:message-handler" >
    <leg> MSG-ID="sip:26345758249sip@example.com" Handling="RETRIEVE"</leg>
    <leg> MSG-ID="sip:26345758265sip@example.com" Handling="KEEP"</leg>
    <leg> MSG-ID="sip:26345758255sip@example.com" Handling="STORE"</leg>
    <leg> MSG-ID="sip:26345758378sip@example.com" Handling="STORE"</leg>
    <leg> MSG-ID="sip:26345758288sip@example.com" Handling="INTERWORK"</leg>
    <leg> MSG-ID="sip:26345758278sip@example.com" Handling="DISCARD"</leg>
    <leg> MSG-ID="sip:26345758355sip@example.com" Handling="KEEP"</leg>
    <leg> MSG-ID="sip:26345758299sip@example.com" Handling="RETRIEVE"</leg>
</message-handler>
```

FIG.5

```xml
<?xml version="1.0"?>
<resource-lists xmlns="urn:oma:xml:cpm:message-handler" >
    <list>
        <entry MSG-ID="sip:26345758245sip@example.com" cp:Handling="RETRIEVE" />
        <entry MSG-ID="sip:26345758295sip@example.com" cp:Handling="RETRIEVE" />
    </list>
</resource-lists>
<message-handler xmlns="urn:oma:xml:cpm:message-handler" >
    <leg> MSG-ID="sip:26345758265sip@example.com" Handling="KEEP"</leg>
    <leg> MSG-ID="sip:26345758255sip@example.com" Handling="STORE"</leg>
    <leg> MSG-ID="sip:26345758375sip@example.com" Handling="STORE"</leg>
    <leg> MSG-ID="sip:26345758285sip@example.com" Handling="INTERWORK"</leg>
    <leg> MSG-ID="sip:26345758275sip@example.com" Handling="DISCARD"</leg>
    <leg> MSG-ID="sip:26345758355sip@example.com" Handling="KEEP"</leg>
</message-handler>
```

FIG.6

MESSAGING

FIELD

The invention relates to the field of telecommunications and, particularly, to messaging.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The evolvement of communication technology, particularly IP-based communication technology and end user device, has enabled versatile communication possibilities and introduction of different services. For example, messaging has evolved from text string short messages with a very limited size to various messaging services able to deliver multimedia content not having size restrictions. Further, the messaging may be bi-directional conversation-type of messaging, such as instant messaging or chatting, or uni-directional messaging, called "one shot" or "standalone" messaging. Basically the difference is that in the bi-directional messaging a recipient of a message receives the message in near real-time fashion but in the uni-directional messaging the recipient may receive the message in near real-time fashion, or the message may be temporarily stored in the recipient's network to be delivered later. A reason for deferred delivery of a message may be that the user is not available or not willing to receive it, i.e. the recipient may be in offline state or lost temporarily connection to the network or the recipient's service settings may indicate that the user does not want to be disturbed at the moment, thereby indicating to hold the message, for example. Such messages are called herein waiting messages.

Some messaging services, such as instant messaging using SIMPLE (session initiation protocol for instant messaging and presence leveraging extensions) or converged IP (Internet protocol) messaging (CPM), provide alternatives for delivery of the waiting messages. Depending, for example, on the recipient's settings, message characteristics and/or service provider policies, the waiting messages may be pushed to the recipient automatically or the recipient may receive a notification on waiting messages and then decide whether to retrieve, delete, or to store to the user's network storage one or more of the deferred messages.

However, a problem is that selecting different alternatives for different messages within a notification is an iterative process. For example, if the user wants to delete two waiting messages and retrieve one waiting message in a SIP-based (session initiation protocol) messaging system, such as CPM, the user opens the notification, selects from the notification messages to be deleted, then selects delete action which triggers deletion function for deferred messages in user equipment the user is using, the deletion function closing the notification and sending delete instructions in SIP REFER request to address delete@hostname. Then the user opens the notification once again, selects from the notification the message(s) to be retrieved and selects retrieval action which triggers retrieval function for deferred messages in the user equipment, the retrieval function closing the notification, sending retrieval instructions in SIP INVITE request to address deferred@hostname.

SUMMARY

An object of the present invention is to enable a user having received a notification on waiting messages, deferred or waiting for another reason, to convey message-specific, possibly different handling instructions in one go. The object of the invention is achieved by means of methods, apparatuses, a system, and a computer program, and a computer readable storage medium as claimed in the independent claims. The preferred embodiments of the invention are disclosed in the dependent claims.

An advantage is that an "one go" solution helps to minimize complexity of a system and it may reduce signalling load of the system.

BRIEF DESCRIPTION OF THE DRAWINGS

In the following different embodiments will be described in greater detail with reference to the attached drawings, in which

FIGS. 5 and 6 illustrate examples of message handling instructions.

DETAILED DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any user device (i.e. user equipment), messaging server, corresponding component, corresponding apparatus, and/or to any communication system or any combination of different communication systems supporting different user selections relating to waiting messages. The communication system may be a wireless communication system or a communication system utilizing both fixed networks and wireless networks. The protocols used and the specifications of communication systems, and apparatuses, especially in wireless communication, develop rapidly. Such development may require extra changes to an embodiment. Therefore, all words and expressions should be interpreted broadly and are intended to illustrate, not to restrict, the embodiment.

In the following, different embodiments will be described using, as an example of an architecture to which the embodiments may be applied, a converged IP messaging CPM enabler architecture without restricting the embodiments to such an architecture, however.

Figure 1:
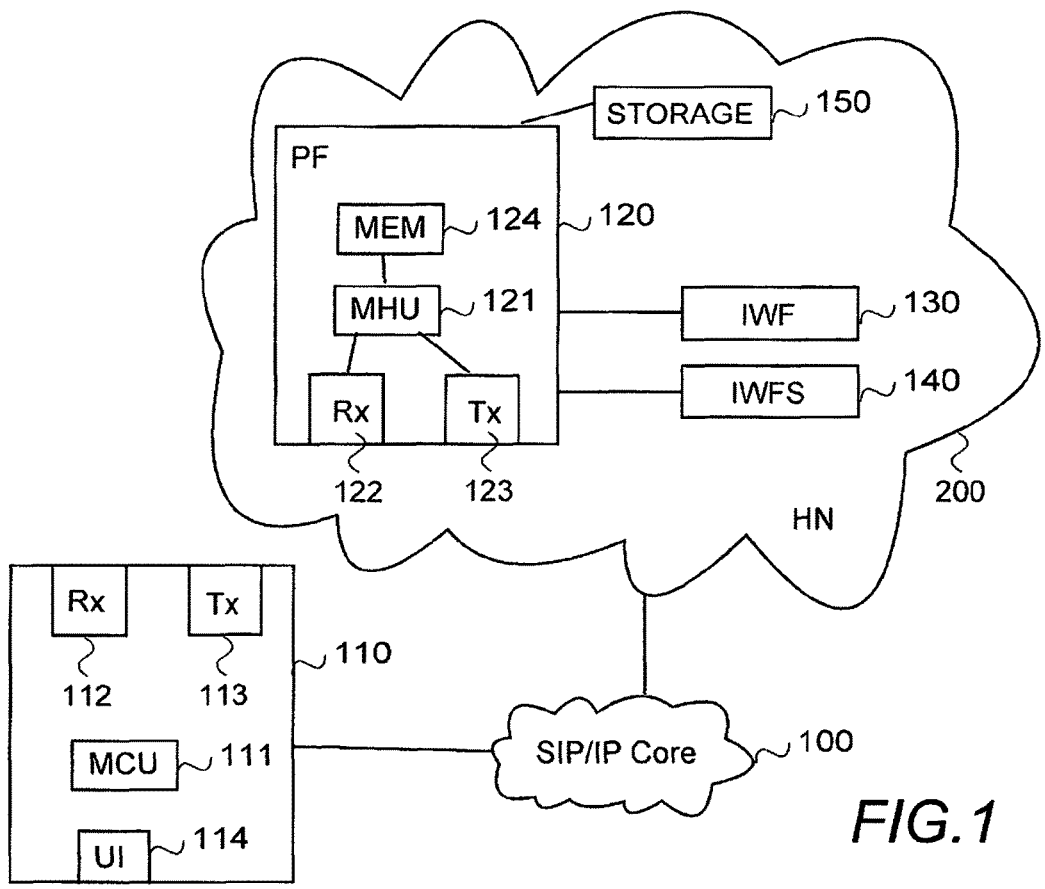
FIG. 1 shows simplified architecture providing messaging and schematic diagrams of apparatuses according to an embodiment.

A general architecture of CPM is illustrated in FIG. 1. FIG. 1 is a simplified architecture only showing some functional entities and elements used below in connection to describe different embodiments. The shown entities and elements are logical units whose implementation may differ from what is shown. The connections shown in FIG. 1 are logical connections; the actual physical connections may be different. It is apparent to a person skilled in the art that CPM also comprises other functions and structures. It should be appreciated that the functions, structures, elements and the protocols used in or for messaging, are irrelevant to the actual invention. Therefore, they need not to be discussed in more detail here.

The CPM enabler (not shown in FIG. 1) provides a framework by defining a horizontal enabler built on top of a SIP/IP core infrastructure system 100. This framework comprises a set of functional components and interfaces that have been designed to facilitate easy deployment of existing and future communication services. For example, the CPM enabler supports full instant messaging, other IP multimedia messaging, push to talk over cellular, and transparent interworking with legacy mobile messaging services in a multi-addresses and multi-devices 110 (only one illustrated in FIG. 1) environment. All CPM-based services will use functional components, such as participating function PF 120, a message storage server 150 which provides a user-specific network storage for user's messages, for example, and interfaces provided by the framework. Non-CPM communication services require interworking functions 130 that provide adaptation/mapping between the CPM enabler and the different technologies to communicate with the framework. For interworking, also interworking selection functions 140 that select an interworking function that perform the actual interworking may be required.

However, the details of CPM are not essential and are therefore not described or illustrated in more detail herein. A more detailed description on CPM is disclosed in documents "Converged IP Messaging Architecture, Draft Version 1.0", 20 Mar. 2009, OMA-AD-CPM-V1_0-20090320-D, "OMA Converged IP Messaging System Description, Draft Version 1.0", 20 Mar. 2009, OMA-TS-CPM_System_Description-V1_0-20090320-D and "Converged IP Messaging Requirements, Draft Version 1.0", 2 Feb. 2009, OMA-RD-CPM-V1_0-20090202-D, which are incorporated by reference herein.

The user device 110 illustrates one type of an apparatus with which a user may receive messages, notifications and give instructions. The user device 110 refers to a computing device that includes fixed communication devices, wireless mobile communication devices operating with or without a subscriber identification module (SIM), including, but not limited to, the following types of devices: mobile phone, smartphone, personal digital assistant (PDA), handset, laptop computer, desktop computer and a fixed phone. The user device 110 is configured to perform one or more of user device functionalities described below with an embodiment, and it may be configured to perform functionalities from different embodiments. For this purpose, the user equipment comprises a messaging client unit MCU 111 for providing functionality to form and transmit handling instructions for message waiting delivery according to one or more of the embodiments described below. The messaging client unit may be part of a CPM client. Further, the user device may comprise other clients, and it comprises different interfaces, such as a receiving unit 112, a sending unit 113 and user interface 114. The user interface may show the user first a handling instruction alternative, then information on waiting messages and then let the user to select messages to which the handling instruction alternative is to be applied, or the user may be provided with the handling instruction alternatives (i.e. options) message by message, so that the user select for each message an alternative. However, how it is implemented, bears no significance to the invention.

The user's home network 200 comprises the participating function PF 120, which acts as the network-side surrogate for the user, including the coordination of interaction with the multiple CPM clients the user may have. The participating function may be seen as a user-specific functional component that may temporarily store in a memory 124 messages that are waiting delivery to the user. The participating function with its memory represents a network node (a computing apparatus) called a messaging server, and the term "messaging server" is used below. The messaging server 120 is configured to perform one or more of messaging server functionalities described below with an embodiment, and it may be configured to perform functionalities from different embodiments. For this purpose, the messaging server comprises a message handling unit MHU 121 for providing functionality to receive handling instructions for waiting messages according to one or more of the embodiments described below. The message handling unit 121 may further be configured to form a notification according to one or more of the embodiments described below. Further, the messaging server may comprise other handling units and functionalities, and it comprises different interfaces, such as a receiving unit 122 and a sending unit 123.

It should be appreciated that the message storage server provides a permanent user-specific storage, whereas the messaging server provides only a temporary buffer which is shared among all users.

Although the apparatuses, i.e. the user device, the messaging server, the message storage server, the interworking function and the interworking selection function, have been depicted as one entity, they (not shown in FIG. 1) may be implemented in one or more physical or logical entities. The units and functions may be software and/or software-hardware and/or firmware components (recorded indelibly on a medium such as read-only-memory or embodied in hard-wired computer circuitry).

The apparatuses may generally include a processor (not shown in FIG. 1), controller, control unit, micro-controller, or the like connected to a memory and to various interfaces of the apparatus. Generally the processor is a central processing unit, but the processor may be an additional operation processor. The messaging client unit 111, and/or the deferred message handling unit 121 may be configured as a computer or a processor, or a microprocessor, such as a single-chip computer element, or as a chipset, including at least a memory for providing storage area used for arithmetic operation and an operation processor for executing the arithmetic operation. The message client unit 111, and/or the message handling unit 121 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments.

The receiving units and the transmitting units each provides an interface in an apparatus, the interface including a transmitter and/or a receiver or a corresponding means for receiving and/or transmitting information, such as data, content, control information, messages and performing necessary functions so that user data, content, control information, signalling and/or messages can be received and/or transmitted. The receiving and sending units may comprise a set of antennas, the number of which is not limited to any particular number.

The apparatuses may generally include volatile and/or non-volatile memory and typically store content, data, or the like. For example, the memory may store computer program code such as software applications (for example, for the message handling unit or the messaging client unit) or operating systems, information, data, content, or the like for the processor to perform steps associated with operation of the apparatus in accordance with embodiments. The memory may be, for example, random access memory, a hard drive, or other fixed data memory or storage device. Further, the memory, or part of it, may be removable memory detachably connected to the apparatus.

It should be appreciated that the apparatuses may comprise other units used in or for messaging, and other information transmission. However, they are irrelevant to the actual invention and, therefore, they need not to be discussed in more detail here.

Below different embodiments are disclosed assuming that user has waiting messages, and a notification on them is sent. The reasons why there are waiting messages or the event that triggers sending the notification bears no significance and therefore they are not described in detail here. In case the user has multiple devices, the notification may be sent to one, some or all of them. However, below it is assumed for clarity's sake that there is only one user device to which the notification is sent.

Figure 2:
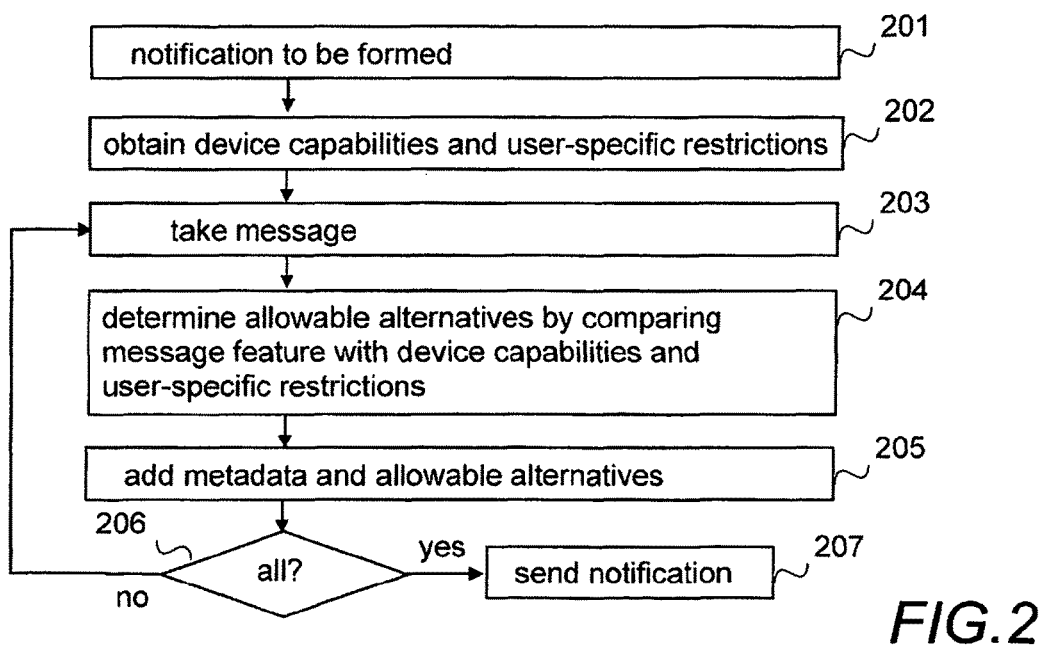
FIG. 2 is a flow chart illustrating notification forming in a server according to an embodiment.

FIG. 2 illustrates functionality of a messaging server, or more precisely, functionality of the message handling unit, in a situation in which a notification is to be formed, i.e. a situation in which a message is not directly delivered or waiting messages pushed without a request.

FIG. 2 starts in a situation in which there are waiting messages, and an event, such as a user becoming available or willing to receive messages, happens. Then a notification is to be formed (step 201). Therefore the messaging server obtains, in step 202, information on capabilities of the user device(s) whereto the notification is to be sent, user-specific restrictions, if any. The information on the capabilities may be obtained from the user device's registration information, or acquired by using a standardized or proprietor method. The user-specific restrictions are settings set by the user and they may be set device-specifically or depending on message properties, such as size or content type. Examples of device capabilities include memory resources, support for media type(s) in a message, supported image/music rendering, supported text support/alphabet, processing capabilities, and video encoding. It should be appreciated that other features, such as information on the user device connectivity, applicable service provider settings, such as those relating to message delivery, and/or properties of networks participating in transmitting the message may also be taken into account.

Then the messaging server takes, in step 203, a message, and determines, in step 204, allowable handling instruction alternatives for this specific message by comparing the message features/characteristics (size, media type etc) with obtained device capabilities and user-specific restrictions. When the allowable alternatives have been determined, the messaging server adds, in step 205 metadata of the message with the allowable alternatives (or indication(s) to them) to a body of the notification. If allowable alternatives have been determined for all waiting messages (step 206), the notification is sent, in step 207. Otherwise the process returns to step 203, and the next message is taken.

The notification may be an in-band notification or an out-of band notification. An in-band notification may be SIP NOTIFY, or a corresponding message having in a body, for example, a summary indicating how many messages there are waiting, and for each message the metadata. The metadata is a header summarizing and identifying the message. The header (metadata) contains preferably a message identifier, or corresponding information with which the specific message can be identified in the messaging server, and the header may further contain one or more of the following fields: to, from, subject, date, size, and priority. The same information may be sent in an out-of band notification, which may be a message sent, for example, as a short message to the user's device.

In another embodiment, the messaging server is configured not to indicate the allowable alternatives with the metadata if all alternatives are allowable. Depending on an implementation, the user device may show all handling alternatives if the indication of alternatives is missing, or the user device may comprise a set of default alternatives that the user device is configured to use if there is no indication of alternatives.

In another embodiment, the user device is configured to determine, on the basis of the received metadata, what alternatives are possible for the corresponding message, and to allow the user select amongst them only.

It should be appreciated that there are embodiments, in which the device capabilities, device connectivity, message characteristics, service provider policies and/or user-specific restrictions are not taken into account but all handling instruction alternatives provided to the user may be the same regardless of the device and/or message properties. At its simplest the notification forming procedure contains only adding to the notification metadata on waiting messages.

Figure 3:
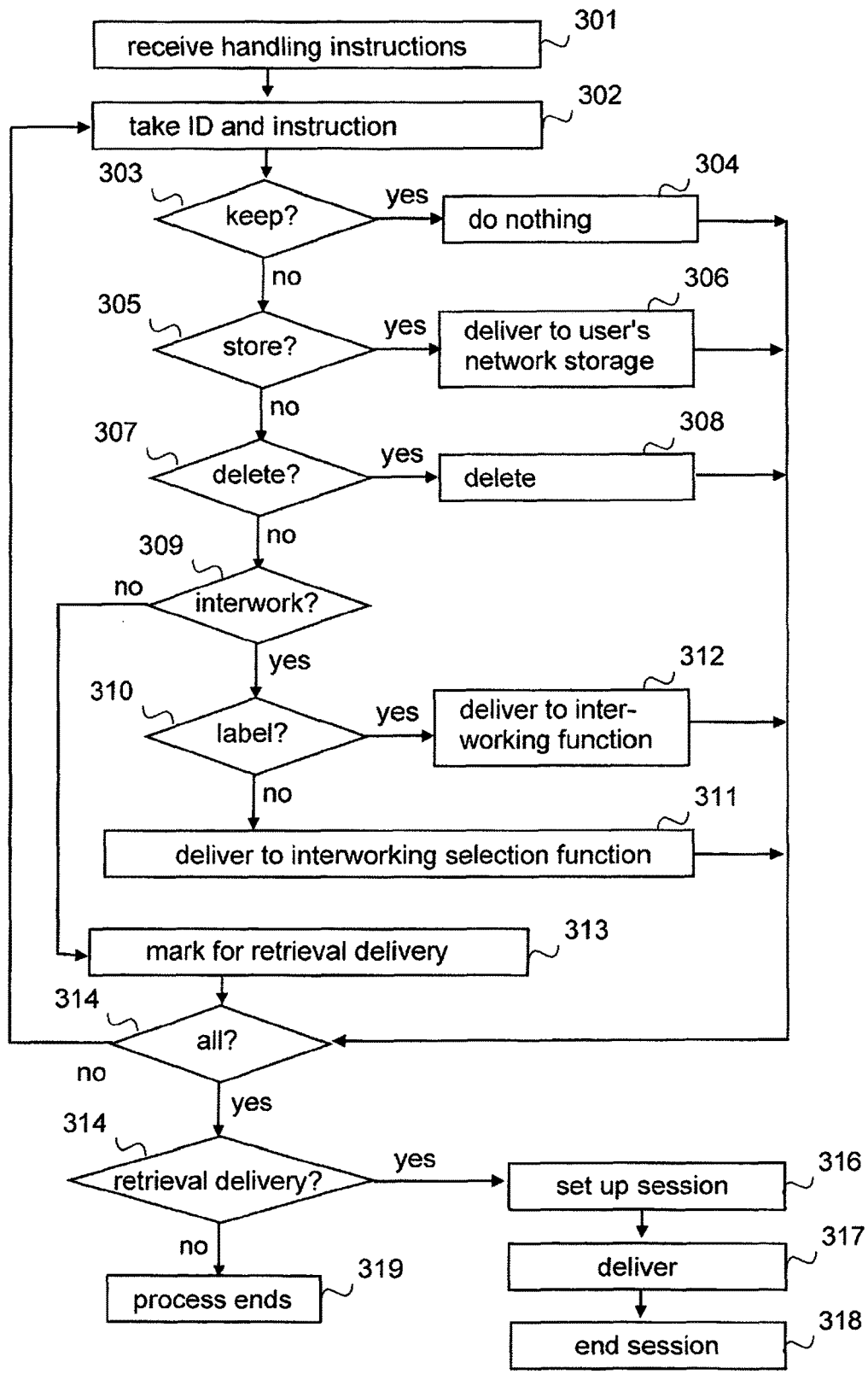
FIG. 3 is a flow chart illustrating message handling functionality of waiting messages in a server according to an embodiment.

FIG. 3 illustrates functionality of a messaging server, or more precisely, functionality of the message handling unit when instructions are received from a user device according to an embodiment. In the embodiment it is assumed that all handling instructions are received in one resource list, such as described in FIG. 5. It should be appreciated that the message handling unit may be configured to apply other handling instructions (such as a timer for temporary storing expiring and causing the message to be deleted) but they are irrelevant to the illustrated example and are not described herein. In the illustrated example it is assumed that all messages are found, and no error situation occurs. An example of an error situation is that no session set up confirmation is received from the user device, if there are messages to be delivered to the user device. These error situations are irrelevant to the illustrated embodiments and therefore are not described herein.

When the messaging server receives (step 301), a message handling document, or other corresponding instructions how to handle one or more of waiting messages, it takes, in step 302, a message identifier, or corresponding information, and the corresponding instruction.

If the instruction is "keep" (step 303), the messaging server continues, in step 304, to store the message in the temporary buffer. In other words, nothing is done to the message. Depending on an implementation, a timer may be updated, and/or the message be notified again later.

If the instruction is "store" (step 305), the message is delivered, in step 306, to the user's network storage.

If the instruction is "delete" (step 307), the message is deleted, in step 308, (without the user seeing/hearing it) from the temporary buffer.

If the instruction is "interwork" (step 309), the messaging server checks, in step 310, whether or not the instruction contains an extension label indicating what interworking function to use. If there is no label or the label indicates that the messaging server, or a network, may decide, the message is delivered, in step 311, to the interworking selection function for further delivery to a proper interworking function. If there is a label indicating what interworking function to use (step 310), the message is delivered, in step 312, to a corresponding interworking function.

If the instruction is none of the above mentioned, in the embodiment the instruction is then "retrieve", and the message is temporarily marked, in step 313, for retrieval delivery.

The above described process from step 302, i.e. from taking a message identifier, or corresponding information, and the corresponding instruction, is repeated until all instructions are handled (step 314).

Then it is checked, in step 315, whether or not there are any messages marked for retrieval delivery, and if yes, the session is set up in step 316, the message(s) marked for retrieval delivery are delivered in step 317, and the session is ended in step 318.

If there is no message marked for retrieval delivery (step 315), the process ends (step 319).

In another embodiment of the invention, no extension labels are used, and all messages having the "interwork" instruction are delivered via the interworking selection function to an interworking function. In other words, steps 310 and 312 are omitted.

In another embodiment, if the extension label indicates what interworking function to use (i.e. answer in step 311 is yes), the interworking selection function is not by-passed, but the message is forwarded with the indication to the interworking selection function so that the interworking selection function can do the final selection.

Although not mentioned, it should be appreciated that after a message is delivered, it is deleted from the temporary buffer.

Figure 4:
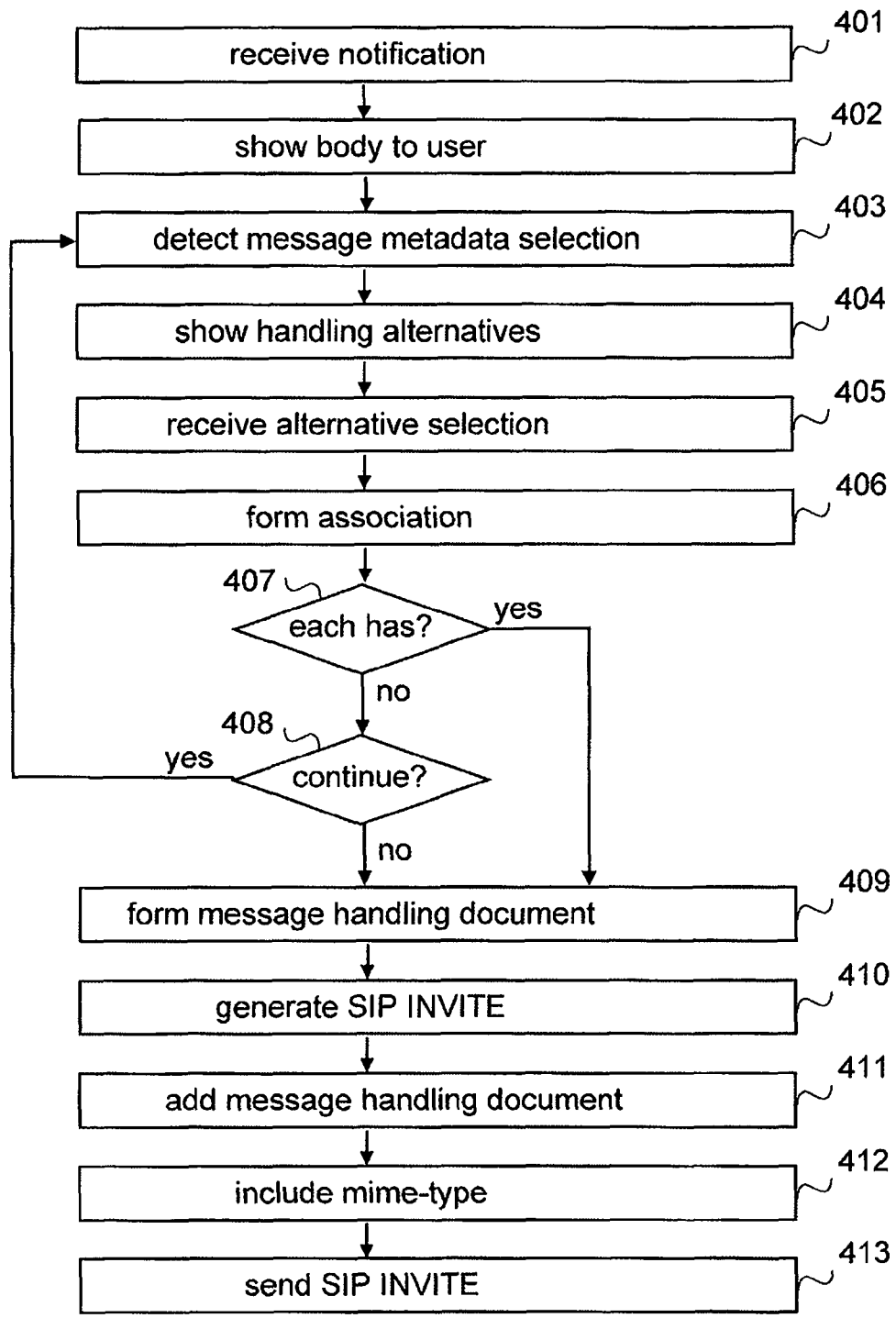
FIG. 4 is a flow chart illustrating functionality in a user device according to an embodiment.

FIG. 4 illustrates handling instruction functionality of a user device, or more precisely, functionality of the messaging client unit according to an embodiment.

The user device receives, in step 401, a notification on waiting messages. As described above, the notification may be an in-band notification or an out-of band notification, and it may be SIP NOTIFY, or a corresponding message having in a body, for example, a summary indicating how many messages there are waiting and preferably for each message a header summarizing and identifying the message, i.e. metadata of the message.

At some point, the body (the content of the notification) is shown (step 402) to a user of the user device, either because the user specifically instructed so, or because of some other event. It is irrelevant what causes the content to be shown. In response to detecting (step 403) that the user has selected a metadata of one message, different handling alternatives are shown, in step 404 to the user. In the illustrated example, the handling alternatives include "retrieve", "keep", "store", "interwork" and "delete", the meaning of these alternatives being described above. In response to the user selecting one of these alternatives, the selection is received, in step 405, and an association is formed, in step 406, with the metadata (or with the message identifier) and the selection. Then it is checked, in step 407, whether or not each metadata has a selection (i.e. an association), and if not, it is then checked, in step 408, whether a user instructions indicating that the user does not want to continue, is received. If the user wants to continue (i.e. no contradictory instruction have been received), the process proceeds to step 403 to detect that the user has selected a metadata of another message.

If each metadata has a selection (step 407) or the user does not want to continue (step 408), the user device forms (compiles), in step 409, a message handling document using the associations to provide message-specific instructions. Examples of the message handling document are described with FIGS. 5 and 6. Then the user device generates, in step 410, a SIP INVITE request, the request having in a multipart/mixed body an SDP (session description protocol) description for a session between the user device and the messaging server and then adds, in step 411, the message handling document to the multipart/mixed body of the request, and includes, in step 412, either in an accept contact header or in a require header field in the request the mime-type of the message handling document, and then sends, in step 413, the request to the messaging server in the home network, the request being addressed to insert_server_function@hostname, for example. An example of a mime-type includes "application/vnd.cpm.message-handling+xml".

In another embodiment, the user device may check, when generating the SIP INVITE, whether or not the alternative "retrieve" is selected at least once. If yes, the user device continues as described above, and if no, the SDP description (or no SDP description) in the SIP INVITE may indicate that the SIP INVITE is used for sending handling instruction and no session establishment is requested. In the embodiment, step 315 in the messaging server is replaced by checking whether or not the SIP INVITE is also for session establishment.

In a further embodiment, the user device may be configured to check after sending the SIP INVITE, whether or not the alternative "retrieve" is selected at least once. If yes, the user device continues the session set up, receives the messages and then ends the session If no, the user device cancels the session set up.

FIG. 5 illustrates an example of message handling instructions according to an embodiment. In the example the message handling instructions is a system message based on XML (extensible markup language) 1.0 document and uses UTF-8 encoding (UTF is a universal character set transformation format), indicated by 5-1. The document utilizes XML namespaces for identifying system management documents and document fragments.

The actual message handling document 500 begins with a root element 5-2 defining the namespace 5-21 and comprising number of leg elements 5-3. Each leg element contains a "MSG-ID" attribute containing a unique identity of a message the requested handling instruction indicated by a "handling" attribute relates to. The message handling document may be identified with the mime-type "application/vnd.cpm.message-id+xml" in CPM. In other architectures another kind of mime-type may be used.

A corresponding XML schema providing a formal description on an appearance of a message handling document illustrated in FIG. 5 is as follows:

```
<?xml version="1.0" encoding="UTF-8"?>
<xs:schema targetNamespace="urn:oma:xml:cpm:message-handler"
    xmlns:xs="http://www.w3.org/2001/XMLSchema"
    xmlns="urn:oma:xml:cpm: message-handler"
    elementFormDefault="qualified"
    attributeFormDefault="unqualified">
    <xs:element name="message-handler" type="HandlingType"/>
    <xs:complexType name="HandlingType">
        <xs:sequence>
            <xs:element name="leg" type="legType"
            maxOccurs="unbounded"/>
            <xs:any namespace="##other" processContents="lax"
minOccurs="0" maxOccurs="unbounded"/>
        </xs:sequence>
        <xs:anyAttribute namespace="##other"
        processContents="lax"/>
    </xs:complexType>
    <xs:complexType name="legType">
        <xs:sequence>
            <xs:any namespace="##other" processContents="lax"
minOccurs="0" maxOccurs="unbounded"/>
        </xs:sequence>
        <xs:attribute name="MSG-ID" type="xs:anyURI"
        use="required"/>
        <xs:attribute name="Handling" type="xs:string"
        use="required"/>
        <xs:simpleType>
                <xs:restriction base="xs:string">
                    <xs:enumeration value="RETRIEVE"/>
                    <xs:enumeration value="KEEP"/>
                    <xs:enumeration value="STORE"/>
                    <xs:enumeration value="INTERWORK"/>
                    <xs:enumeration value="DISCARD"/>
                </xs:restriction>
            </xs:simpleType>
        <xs:anyAttribute namespace="##other"
        processContents="lax"/>
    </xs:complexType>
</xs:schema>
```

An advantage of the embodiment is that everything is in one body.

FIG. 6 illustrates another example of message handling instructions according to a further embodiment. In the example the message handling instructions differ from the one illustrated in FIG. 5 in that respect that the handling indications for "retrieve" are held in their own body as a resource-list, but the other handling indications are in a similar body than the body described with FIG. 5.

In other words, the message handling instructions is a system message based on XML (extensible markup language) 1.0 document and uses UTF-8 encoding (UTF is a universal character set transformation format), indicated by 6-1. The actual message handling document 600 comprises two parts: a resource list (a first body 6-6) comprising list elements 6-5 beginning with a root element 6-4 and a message handling document (a second body 6-7) comprising leg elements 6-3 and beginning with a root element 6-2, both root elements from the namespace 6-21. Each list and leg element contains an "MSG-ID" attribute containing a unique identity of a message the requested handling instruction indicated by a "handling" attribute relates to. The message handling document may be identified with the mime-type "application/vnd.cpm.message-id+xml" in CPM. In other architectures another kind of mime-type may be used.

An advantage of the embodiment is that the prior art body for content type "application/resource-list+xml" used for retrieve messages can be reused without change.

It should be appreciated that in further embodiments, the message handling instructions may be formed so that there is a separate body for each different instruction alternative, or some of them may have a common body and some their own body. For example, "store" and "keep" may have a common body, but "retrieve", "delete" and "interwork" their own body.

Although not shown in FIGS. 5 and 6, the SIP INVITE request contains also information describing the session to be formed to convey the messages having "retrieve" as their instruction.

Figure 7:
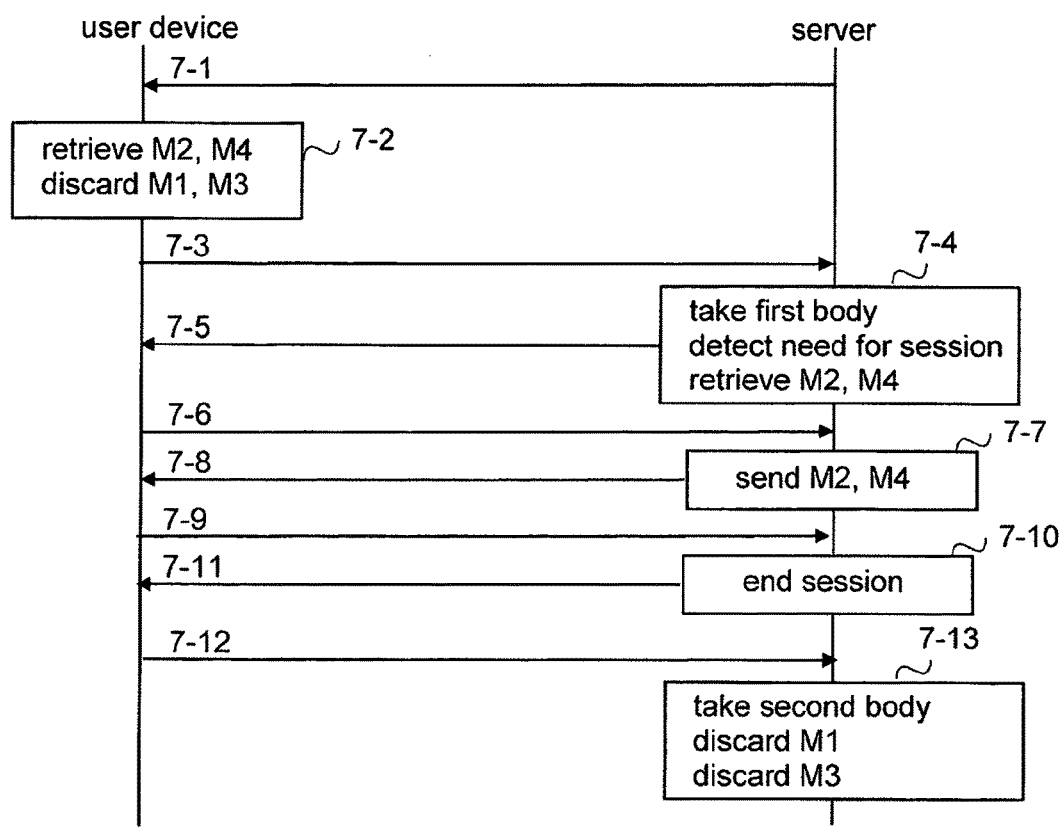
FIG. 7 illustrates signalling example according to an embodiment.

FIG. 7 illustrates signalling according to an embodiment of the invention in a situation in which the handling instruction comprises a separate body for "retrieve" and a separate body for other handling alternatives.

Referring to FIG. 7, the user device receives a notification 7-1. The notification may be a SIP NOTIFY and in the illustrated example it informs that there are four messages M1, M2, M3 and M4 waiting. The user device receives, in point 7-2, user input that indicates that messages M2 and M4 are to be retrieved, messages M1 and M3 discarded. Therefore the user device forms, in point 7-3 a handling instruction that contains list definitions for M2 and M4 and leg definitions for M1 and M3. Then the user device sends the handling instructions 7-3. The handling instruction may be SIP INVITE.

When the messaging server receives, in point 7-4, handling instructions 7-3, it takes a first body, detects that there is list definitions, and therefore a session needs to be established, the session being described in the handling instruction 7-3. Thus, the messaging server sends an acceptance 7-5, such as SIP 200 OK, and retrieves, in point 7-4, messages M2 and M4. After receiving from the user device an acknowledgement 7-6, such as SIP ACK, for the message sending session, the messaging server sends (point 7-7) the messages M2 and M4 in message 7-8, such as MSRP (message session relay protocol) SEND. When the user device has received messages M2 and M4, the user devices acknowledges the reception by sending message 7-9, such as MSRP OK. After receiving the acceptance, the messaging server ends (point 7-10) the session by sending message 7-11, such as SIP BYE, and the user device confirms that the session will end by sending message 7-12, such as SIP 200 OK.

Meanwhile, or after that, the messaging server takes, in point 7-13, a second body, and goes the leg definitions trough leg by leg. In this example, the messaging server deletes messages M1 and M3 from the temporary storage.

If no message is to be retrieved, the messaging server may acknowledge the handling instruction by sending a specific type of message indicating that the instructions are received but no session is established.

In another embodiment, if there is no instruction associated with a message, i.e. the resource list is formed so that it contains all the same identifiers that were sent in a notification, but the user has not provided any instruction for a message, the messaging server may be configured to use a default value, such as "keep", or to treat the message as "non-notified". The default-value may be user-specific or service provider-specific and it may depend on message content, size, user device capabilities, etc.

As can be seen from the above example, the invention is not limited to CPM but it may be implemented in any system utilizing SIP or corresponding platform. An example includes a SIMPLE instant messaging system.

The handling instruction alternatives given above are only exemplary and only some of them may be used, or in addition to them, or some of them, some other handling instructions, such as "forward", may be used, or for the same purpose another term may be used. For example, in the above terms "delete" and "discard" have been used for the same purpose. In other words, the handling instruction alternatives are not restricted in any way.

Although in the above the embodiments have been described, for the sake of clarity, assuming that one message has one handling instruction, it should be appreciated that one message may have more than one handling instruction, and the messaging server performs them. For example, there may be only one waiting message, and the user instructs to forward the message to another user and in addition to store or retrieve it.

The steps/points, messages, information exchange and related functions described above in FIGS. 2 to 7 are in no absolute chronological order, and some of the steps/points or functions may be performed and/or messages sent simultaneously or in an order differing from the given one. For example, messages may be delivered to a user device while other messages are deleted or stored. Other functions can also be executed between the points or functions or within the steps/points and other messages sent between the illustrated messages, such as sending acknowledgements. Some of the functions or the steps/points or part of the steps/points can also be left out or replaced by a corresponding function or step/point or part of the step/point. Further, functions, steps/points and/or messages described with different embodiments may be combined to obtain further embodiments. The messages are only exemplary and may even comprise several separate messages for transmitting the same information. In addition, the messages may also contain other information. Depending on the network technologies involved, other entities may take part to the signalling than those described above.

Although in the above the embodiments have been described assuming that the messaging server is in the user's home network, it should be appreciated that a solution, in which waiting messages are stored in another network than the home network, and the messaging server locates in such a network, is possible and straightforwardly implementable using the above descriptions.

The techniques described herein may be implemented by various means so that an apparatus implementing one or more functions of a corresponding user device or messaging server described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method, comprising:
receiving at a user device a notification indicating that at least two messages are waiting for delivery;
receiving at the user device via a user interface selectable handling instructions for the at least two messages;
receiving at the user device as a user input a first handling instruction of the selectable handling instructions for a first message;
receiving at the user device as a user input a second handling instruction of the selectable handling instructions for a second message, wherein the second handling instruction differs from the first handling instruction;
forming at the user device a request comprising the received handling instructions, wherein the handling instructions comprise the first handling instruction and the second handling instruction; and
sending the request comprising the received handling instructions from the user device.

2. The method according to claim 1, wherein the notification comprises for each of the at least two messages metadata including at least information identifying the at least two messages.

3. The method according to claim 1, wherein the request containing the handling instructions comprises the handling instructions in one body.

4. The method according to claim 1, wherein the request comprising the handling instructions comprises a first body for the at least two messages to be delivered and a second body for the handling instructions.

5. The method according to claim 1, wherein the handling instructions indicate at least one of delivering, keeping in a temporary storage, storing in a non-temporary storage, interworking, or deleting.

6. The method according to claim 5, wherein the handling instructions indicating interworking further comprises a label indicating an interworking function to be used.

7. A computer program, embodied on a non-transitory computer-readable medium, comprising program code configured to encode instructions that, when the computer program is run on a computer, the computer performs a process comprising:
receiving at a user device a notification indicating that at least two messages are waiting for delivery;
receiving at the user device via a user interface selectable handling instructions of the selectable handling instructions for the messages;
receiving at the user device as a user input a first handling instruction of the selectable handling instructions for a first message;
receiving at the user device as a user input a second handling instruction of the selectable handling instructions for a second message, wherein the second handling instruction differs from the first handling instruction;
forming at the user device a request comprising the received handling instructions, wherein the handling instructions comprise the first handling instruction and the second handling instruction; and
sending the request comprising the received handling instructions from the user device.

8. An apparatus configured to perform a method as claimed in method claim 1.

9. The apparatus as claimed in claim 8, wherein the apparatus is a user device.

10. A system comprising the apparatus as claimed in claim 8, further comprising:
a receiver configured to receive a request relating to the at least two messages waiting delivery, the request comprising at least two different types of message specific handling instructions; and
a processor configured to handle each of the at least two messages according to a corresponding message specific handling instruction.

11. The system as claimed in claim 10, the system configured to support converged internet protocol messaging and/or instant messaging.

12. A method, comprising:
receiving at a user device a notification indicating that at least one message is waiting for delivery;
receiving at the user device via a user interface selectable handling instructions for the at least one message;
receiving at the user device as a user input a first handling instruction and a second handling instruction for the message;
forming at the user device a request comprising the received handling instructions; and
sending from the user device the request comprising the request.

13. A method, comprising:
sending to a user device a notification indicating that at least two messages are waiting for delivery;
receiving from the user device a request comprising at least two different types of message specific handling instructions selected via a user interface; and
handling each of the at least two messages according to a corresponding message specific handling instruction of the message specific handling instructions.

14. The method according to claim 13, further comprising:
determining for the at least two messages to be notified selectable handling instructions based on at least one of message properties, user device capabilities, or user-specific instructions; and
adding to the notification prior to sending it message specific handling instruction alternatives or indications for handling instruction alternatives.

15. A network apparatus comprising:
a receiver configured to receive a request relating to at least one message waiting delivery, the message being stored at a messaging server being a device distinct from the network apparatus and via which the network apparatus communicates via an intermediate network, the request comprising at least two different types of message specific handling instructions selected via a user interface; and
a processor configured to handle each of the at least one messages according to corresponding message specific handling instructions.

16. The network apparatus according to claim 15, the apparatus further comprising:
a processor configured to form a notification on the at least one message waiting, the notification comprising for each of the at least one message metadata including at least information identifying the message; and
a transmitter configured to send the notification.

17. The network apparatus according to claim 16, further comprising:
a processor configured to determine for the at least one message to be notified selectable handling instructions for the at least one message based on at least one of message properties, user device capabilities and user-specific instructions, and
wherein the processor is configured to add to the notification message specific handling instruction alternatives or indications on handling instruction alternatives determined by the processor configured to determine.

18. The network apparatus as claimed in claim 15, wherein the apparatus is a network node comprising a participating function or a messaging server.

19. A messaging server apparatus comprising:
a receiver configured to receive from a user device being a device distinct from the messaging server apparatus and via which the messaging server apparatus communicates by means of an intermediate network a request containing two or more different message specific handling instructions selected via a user interface for at least one message waiting delivery and stored at a messaging server;
a message handling unit configured to handle the at least one message according to the received message specific handling instructions for the at least one message.

20. The messaging server apparatus as claimed in claim 19, wherein the messaging server apparatus comprises a processor configured to comprise the message handling unit.

* * * * *